United States Patent Office 3,778,395
Patented Dec. 11, 1973

3,778,395
PRINTING INKS COMPRISING A URALKYD
Gregory J. Huelsman, Wyckoff, and Robert E. Bell and Gerald Edward Rohe, Cincinnati, Ohio, assignors to Borden Inc.
No Drawing. Continuation of application Ser. No. 27,124, Apr. 9, 1970, which is a continuation-in-part of application Ser. No. 664,270, Aug. 30, 1967, both now abandoned. This application Feb. 18, 1972, Ser. No. 227,628
Int. Cl. C09d 3/72, 11/10
U.S. Cl. 260—22 TN    9 Claims

ABSTRACT OF THE DISCLOSURE

This invention relates to printing inks drying by oxidative polymerization having a low tack to viscosity ratio comprising a coloring agent and a vehicle in which the vehicle comprises from 10% to 100% of a modified uralkyd, said uralkyd prepared by the sequential steps of making an alkyd prepolymer, said prepolymer being the reaction product of an unsaturated fatty acid or ester thereof, a polyol and a polycarboxylic acid and then reacting the prepolymer with a polyisocyanate.

RELATED INVENTIONS

This application is a continuation of copending application Ser. No. 27,124 filed April 9, 1970, now abandoned, which in turn was a continuation-in-part of copending Ser. No. 664,270 filed Aug. 30, 1967, now abandoned.

BACKGROUND OF THE INVENTION

Among the classes of materials used to make printing inks are fluid ingredients or vehicles. The function of the vehicle is to act as a carrier for the pigment and as a binder to affix the pigment to the printed surface. The nature of the composition used to make up the vehicle depends in part on the type of printing application. The vehicle is usually a drying oil type when the product is to be incorporated into an ink suitable for use in letterpress or offset printing. Such oils are frequently of vegetable or petroleum origin, which can optionally be modified in several ways depending upon the particular characteristics desired. These oils dry by an oxidation type process, and polymerize when exposed to the atmosphere to form a thin film.

Considerable investigation has been made by the printing industry to determine the various rheological parameters controlling ink behavior. The two most often measured parameters and principle variables effecting ink performance are viscosity and tack. Tack may generally be defined as a relative measurement of the cohesion of an ink film which is responsible for its resistance to splitting between two rapidly moving surfaces. Measurement of tack on a suitable instrument, such as a Thwing-Albert Inkometer, appears to be the most widely used approach to assessing the forces involved in ink film splitting and the suitability of inks for wet printing. Viscosity is that property of a material by virtue of which it tends to resist deformation to flow. Both viscosity and tack are functions of the rate of shear to which the material is subjected.

It is known that the most satisfactory printing performance, particularly in letterpress and offset printing is obtained with inks incorporating high viscosity vehicles, which give the most desirable ink distribution on the press rollers, continuity of print, minimization of linting, print fidelity and emulsification resistance. It has also been found that the most desirable printing performance is obtained when the vehicle not only has a high viscosity but also low tack. The requirements for low tack are based upon fundamental viscoelastic considerations which are manifested by less frequent equipment jamming, improved print fidelity, minimization of sheet curl, reduced picking and reduced equipment power requirements.

Prior art drying oils are not entirely satisfactory for use as printing vehicles. The difficulties result from the fact that it has not been possible to avoid the undesirable high tack levels which also inherently exist with the known high viscosity drying oils. Moreover, combinations and modifications of these drying oils with resins, wax, solvents, drying catalysts, chemicals and plasticizers while successful to obtain faster and harder drying vehicles have not proven satisfactory when incorporated into inks to achieve the desired properties of low vehicle tack at high vehicle viscosity levels.

Additionally, at the high shear rates which are normally encountered under actual printing press operating conditions, e.g., in the order of 100 to 100,000 sec.$^{-1}$ the tack of the vehicle which is a function of shear rate also increases. This further aggravates the obtainment of a favorable tack-viscosity relationship, notwithstanding the comparatively small decrease in the viscosity of the vehicle at the higher shear rates.

SUMMARY OF THE INVENTION

A printing ink containing oxidation vehicles has now been found having a unique viscosity-tack relationship which will provide the desired printing results and which has a lower, up to 50% lower tack level than inks made from prior art vehicles, for a given corresponding vehicle viscosity level.

The present invention is a printing ink comprising a color body and an oxidation vehicle, which vehicle contains for each 100 parts by weight thereof, from about 10 to 100 parts by weight of a modified uralkyd prepared by the sequential step of making an alkyd prepolymer, said prepolymer being the reaction product of an unsaturated fatty acid or ester thereof, a polyol, and a polycarboxylic acid and then reacting the thus formed prepolymer with a polyisocyanate.

DETAILED DESCRIPTION

As to materials, the ink comprises a color body and an oxidation vehicle. The proportions of each vary widely dependent upon the color, strength and printing press performance desired; and, there is no criticality as to the proportion of each in the ink; only in the uralkyd used in the vehicle.

The color body can be any pigment used to impart color or viscosity to printing ink. It can be inorganic, organic, black pigment or mixtures thereof. In addition, a dye can be used as the color body or incorporated into the pigmented letterpress ink. Specific examples of suitable pigments are lithopone (mixture of zinc sulphide and barium sulphate), Iron Blue (complex ferriferrocyanides), Ultra-marine Blue (complex aluminum sulfo-silicate), Chrome Yellow (lead chromate), Chrome Green (lead chromate with ferric ferrocyanide), C.P. Cadmium Red (pure cadmium selenide), Molybdate Orange (mixed crystal of lead sulphate, lead chromate, and lead molybdate), Benzidine Yellow (dichlorbenzidine coupled with acetoacet-o-anisidide), fluorescent pigments, aluminum powder, Persian Orange (alumina hydrate lake of Orange II sulphonic acid coupled with beta-naphthol) Methyl Violet (phosphotungstic or phosphomolybdic acid complex of dimethylaniline), Toluidine Red (m-nitro-o-toluidine coupled with beta-naphthol), Calcium Lithol Red (calcium salt of tobias acid coupled with beta-naphthol), Rhodamine Red (phosphotungstic or phosphomolybdic acid complex of the reaction of monoethyl-m-aminophenol with phthalic anhydride and ethyl alcohol), Phthalocyanine Blue (alpha and beta crystalline forms of copper phthalocyanine) carbon black, aluminum stearate, clay (aluminum silicate), calcium carbonate, and the like pigments used in inks. They can be used in their usual proportions.

The vehicle in which the pigment is carried is defined as all non-pigment components. This vehicle must be at least 10% by weight of uralkyd resin. While the uralkyd may comprise the entire total weight of the vehicle, for most uses the usual resins, waxes, solvents, other drying oils, drying catalysts and plasticizers used in letterpress and offset inks can also be used in the vehicle. Examples of suitable resins are rosin (heat polymerized rosin, rosin salts, rosin esters and the like) coumarone-indene resins, polymerization products of phenol and formaldehyde with rosin, maleic and fumaric acid condensation products, phthalic and isophthalic alkyds, and cellulose esters. As to waxes, examples are petroleum waxes (paraffin and microcrystalline), synthetic waxes (such as ethylene vinyl acetate copolymers), and non-mineral waxes (carnauba, beeswax and the like). Examples of drying oils are linseed oil, chinawood oil, safflower oil, oiticica oil, soybean oil, dehydrated castor oil, maleinized linseed oil and mixtures thereof. Examples of drying catalysts are cobalt naphthenate, manganese linoleate, and zirconium naphthenate. Examples of solvents are aliphatic petroleum distillates, nitroparaffins, and alkyl alcohols. Examples of plasticizers are dioctyl phthalate, tricresyl phosphate, and diethylene glycol monolaurate, the particular selection being dependent upon the specific application as well known to those skilled in the art.

The modified uralkyd polymer is a critical component of the present invention. This polymer is made by a two-step process which comprises first preparing an alkyd prepolymer, which is then reacted with a polyisocyanate to yield the desired uralkyd.

The alkyd prepolymer is the reaction product of an unsaturated acid or ester thereof, a polyol and a polycarboxylic acid, its anhydrides or mixtures thereof. The unsaturated acids contemplated are those formed by the hydrolysis of any oil of the so-called drying or semi-drying type, such as linseed oil, tung oil, safflower oil, soybean oil, which may contain linoleic acid, linolenic acid, oleic acid, stearic acid, palmitic acid and the like. Polyols suitable for use are alcohols which are polyfunctional, preferably at least trifunctional exemplary of which are pentaerythritol, sorbitol, mannitol and trimethylol propane.

The polycarboxylic acids employed herein are aryl polycarboxylic acids wherein the aryl group is an aromatic hydrocarbon of from 6 to 20 carbons such as phenyl, lower alkyl substituted phenyl, napthyl and the like. Exemplary acids are o, m or p benzene dicarboxylic acid, trimellitic acid. Preferred are the monocyclic aryl polycarboxylic acids.

The alkyd prepolymer may be prepared by several alternate methods. One such method is by reacting an ester of an unsaturated fatty acid, e.g., the glyceryl ester, derived from any oil of the so-called drying or semi-drying types, such as linseed oil, tung oil, safflower or soybean oil and a polycarboxylic acid such as, for example, an ortho, meta or para-benzene dicarboxylic acid or their anhydrides or mixtures thereof. The drying oil, which should be water-free is first subjected to an alcoholysis reaction with a polyhydroxy alcohol such as pentaerythritol, tripentaerythritol and other conventional polyfunctional alcohols to produce an ester having a plurality of hydroxyl groups thereof prior to condensation with the polydicarboxylic acid. The alcoholysis modification is for the purpose of introducing reactive hydroxyl groups into the triglyceride of the drying oil. The alcoholysis is performed with an alcohol which is at least trifunctional in nature. It will be understood that the so-called polyhydroxy esters mentioned above are in fact mixed esters and could be prepared by the reaction between selected amounts of the free fatty acid and the desired polyhydroxy alcohol. The alcoholysis reaction is conducted in the presence of a basic catalyst such as calcium hydroxide, sodium hydroxide or metal salts of naphthenic acid at a temperature of about 410° F. to 450° F.

The converted oil is then reacted by heating with the polycarboxylic acid at a temperature of about 150° F. to 250° F. The reaction is suitably conducted in a high boiling aliphatic solvent such as mineral oil. Alternatively, the same alkyd prepolymer detailed above can be prepared by concurrent reaction of an oil of the drying or semi-drying type, a polyol and a polycarboxylic acid or its anhydrides or mixtures thereof.

Suitable alkyd prepolymers are those which are further characterized by having a hydroxyl value of between 35 and 290, preferably between 100 and 125 and an acid number of from 0 to 5.0, preferably from 0.05 to 0.2.

In the second step of the process, the alkyd prepolymer is reacted with a polyisocyanate, preferably an aromatic diisocyanate such as tolylene diisocyanate. However, both aliphatic and aromatic diisocyanates can be used to react with polyhydric compounds to produce the modified uralkyd which are suitable for purposes of this invention. Illustrative of such diisocyanates are the following: hexamethylene diisocyanate, 1,5-naphthylenediisocyanate, p-phenylene diisocyanate, m-phenylene diisocyanate, 4,4'-diisocyanate dibenzyl, diphenylmethane-p-p'-diisocyanate, triphenylmethane-p,p'-diisocyanate, tetramethylene-diisocyanate, 4,4' - dicyclohexylmethane-diisocyanate, 1-methyl benzene - 2,4,6 - triisocyanate, 1-chloro-phenylene-2,4-diisocyanate, xenylene - 4,4' - diisocyanate, cyclohexylene-1,2 - diisocyanate, cyclohexylene - 1,4-diisocyanate, 4,4'-diphenyl diisocyanate, 3,5 - tolyl diisocyanate, 2,4-tolylene diisocyanate, 3,3' - dimethyl 4,4' - biphenylene diisocyanate, 3,3' - dimethoxy 4,4' - biphenylene diisocyanate, 4,4' - methylene di-o-tolyl diisocyanate. The reaction is conveniently conducted in an inert solvent, e.g., a hydrocarbon such as mineral spirits, for a sufficient time to permit the isocyanate radical to substantially combine with the hydroxyl group of the prepolymer. The reaction is carried out at a temperature of about 90° F. to 140° F. The basic catalysts added during the preparation of the prepolymer should be neutralized before the addition of the diisocyanate. Extreme care should be exercised to avoid water contamination during this reaction since water can reduce the viscosity. It is preferred to employ a 1/1 ratio of mole equivalents of alkyd prepolymer relative to the diisocyanate, although a range of 1/0.8 to 1/1.2 may be used, provided any major excess of isocyanate is subsequently reacted with a chain stopping monohydric alcohol such as ethanol or isopropanol. A slight excess of either OH groups or NCO groups in the end product will not adversely effect the tack-viscosity relationship.

It will be understood that the method of preparation of the modified uralkyds are well known to the art. Further, certain types of urethanes have been used in printing ink vehicles prior to the present invention. The distinguishing features of the instant urethane based composition is that the urethane component is derived from the above-specified alkyd prepolymer yielding a uralkyd having a unique viscosity-tack relationship.

Specific commercial examples of the modified uralkyds are Urethane Oils 2411; X 985 and H–6294 sold by Superior Varnish and Dryer Co.

In ordinary commercial practice, the pigment content comprises from about 10 to 60% by weight of the ink with the remainder being vehicle.

The printing inks of the present invention are prepared in the usual manner by incorporating the pigment into the vehicle by dispersion. Alternatively, pigment flushings which result from the phase transfer of an aqueous pigment pulp into an oleoresinous pigment paste, can be used.

The invention is further described in connection with the following examples which are set forth for purposes of illustration.

EXAMPLE 1

Two inks were prepared (1A and 1B). In ink 1A the vehicle was 100% urethane oil of a Gardner-Holdt bubble tube Z–10 viscosity and in 1B the vehicle was 100% of a modified phenolic-linseed-aliphatic petroleum distillate varnish of a Gardner-Holdt bubble tube Z–10 viscosity.

Ink 1A

| | |
|---|---|
| Molybdate orange | 15.0 |
| Modified uralkyd (Urethane Oil 2411) | 85.0 |
| | 100.0 |

Ink 1B

| | |
|---|---|
| Molybdate orange | 15.0 |
| Phenolic-linseed-aliphatic varnish | 85.0 |
| | 100.0 |

Tack readings on the Thwing-Albert Inkometer were as follows:

| Roller r.p.m. | 1A | 1B |
|---|---|---|
| 400 | 15.0 | 29.0 |
| 800 | 15.5 | 37.5 |
| 1,200 | 15.0 | 42.0 |

EXAMPLE 2

Two inks were prepared, one in which the vehicle was 10% modified uralkyd and one in which the vehicle contained no uralkyd.

Formula 2A

| | |
|---|---|
| Lithol Rubine Red (calcium or manganese salt of p-toluidine, m-sulphonic acid coupled with beta-hydroxynaphthoic acid) | 22.1 |
| Ketoxime antioxidant | 0.2 |
| Manganese naphthenate | 1.0 |
| Cobalt naphthenate drier | 0.8 |
| Polyethylene-linseed wax compound | 3.0 |
| Aliphatic petroleum distillate | 6.9 |
| Isophthalic alkyd | 10.9 |
| Phenolic-linseed-Chinawood oil varnish | 3.9 |
| Phenolic-linseed-aliphatic varnish | 12.6 |
| Maleic-aliphatic-isophthalic alkyd varnish | 30.8 |
| Modified uralkyd (Urethane Oil 2411) | 7.8 |
| | 100.0 |

Formula 2B

| | |
|---|---|
| Lithol Rubine Red | 22.1 |
| Ketoxime antioxidant | 0.2 |
| Manganese naphthenate drier | 1.0 |
| Cobalt naphthenate drier | 0.8 |
| Polyethylene-linseed wax compound | 3.0 |
| Aliphatic petroleum distillate | 6.9 |
| Isophthalic acid | 11.3 |
| Phenolic-linseed-Chinawood oil varnish | 5.0 |
| Maleic-aliphatic-isophthalic alkyd varnish | 34.0 |
| | 100.0 |

Tack readings on the Thwing-Albert Inkometer were as follows:

| Roller r.p.m. | 1A | 2B |
|---|---|---|
| 400 | 11.0 | 12.0 |
| 800 | 16.0 | 17.0 |
| 1,200 | 19.5 | 21.0 |

EXAMPLE 3

Two letterpress inks were prepared; one in which the vehicle was 50% modified uralkyd and one in which the vehicle contained no uralkyd oil.

Formula 3A

| | |
|---|---|
| Molybdate orange | 15.0 |
| Ester gum-mineral oil varnish | 42.5 |
| Uralkyd (Urethane Oil 2411) | 42.5 |
| | 100.0 |

Formula 3B

| | |
|---|---|
| Molybdate orange | 15.0 |
| Ester gum-mineral oil varnish | 85.0 |
| | 100.0 |

Tack readings on the Thwing-Albert Inkometer were as follows:

| Roller r.p.m. | 3A | 3B |
|---|---|---|
| 400 | 3.0 | 5.0 |
| 800 | 5.5 | 9.0 |
| 1,200 | 7.0 | 12.0 |

EXAMPLE 4

Two offset inks were prepared; one in which the vehicle was 20% modified uralkyd and one in which the vehicle contained no uralkyd oil.

Formula 4A

| | |
|---|---|
| Lithol Rubine Red | 22.1 |
| Ketoxime antioxidant | 0.2 |
| Manganese naphthenate drier | 1.0 |
| Cobalt naphthenate drier | 0.8 |
| Polyethylene-linseed wax compound | 3.0 |
| Aliphatic petroleum distillate | 6.9 |
| Isophthalic alkyd | 4.3 |
| Phenolic-linseed-Chinawood oil varnish | 15.7 |
| Maleic-linseed-aliphatic varnish | 26.0 |
| Modified uralkyd (Urethane Oil 2411) | 20.0 |
| | 100.0 |

Formula 4B

Same as 2B.

Tack readings on the Thwing-Albert Inkometer were as follows:

| Roller r.p.m. | 4A | 4B (2B) |
|---|---|---|
| 400 | 9.0 | 12.0 |
| 800 | 14.0 | 17.0 |
| 1,200 | 18.0 | 21.0 |

Formula 4A yielded printing results which when compared to Formula 4B support up to 20% more ink transfer. This was demonstrated on a Vandercook Universal I printing press when the prints were examined for optical density with a Welch Scientific Company "Densichron."

EXAMPLE 5

The following two inks represent a comparison of an offset ink in which the vehicle was 80% modified uralkyd and one in which the vehicle contained no uralkyd oil.

Formula 5A

| | |
|---|---|
| Modified uralkyd (Urethane Oil 2411) | 68.0 |
| Polyethylene-linseed wax compound | 10.0 |
| Manganese naphthenate | 1.0 |
| Safflower oil | 7.0 |
| Benzidine Yellow | 14.0 |
| | 100.0 |

Formula 5B

| | |
|---|---|
| Phenolic-linseed-aliphatic varnish | 57.0 |
| Polyethylene-linseed wax compound | 10.0 |
| Manganese naphthenate | 1.0 |
| Safflower oil | 18.0 |
| Benzidine Yellow | 14.0 |
| | 100.0 |

Tack readings on the Thwing-Albert Inkometer were as follows:

| Roller r.p.m. | 5A | 5B |
|---|---|---|
| 400 | 11.6 | 10.6 |
| 800 | 14.8 | 14.8 |
| 1,200 | 16.4 | 19.4 |

It can be seen that the tack at 800 r.p.m. is equal. However, a viscosity comparison at this equal tack showed that ink 5B had a flow of 50 at an applied stress of 2600 dynes whereas ink 5A had a flow of 17.5 at the same stress.

This viscosity comparison was made by plotting the flow (paddle r.p.m. on a Stormer viscometer) to resistance to it as determined by the force required on the Stormer viscometer to achieve the given r.p.m. Since by definition viscosity is the resistance to flow, this measurement represents a viscosity comparison which reflects higher viscosity at equal tack level.

Formula 6A 737 parts of alkali refined linseed oil, 100 parts of a bodied linseed oil with a viscosity of about 30 poises and two parts lithium naphthenate are heated at about 480° F. with 68 parts of pentaerythritol to complete alcoholysis. The mixture is cooled and thereafter 90 parts toluene diisocyanate are added and reacted at 120° F. for two hours. After filtration, the urethane obtained has a viscosity of 22 poises. 100 parts of this urethane was pigmented with 40 parts carbon black yielding a pigment paste having the following viscosities as measured by a Laray viscometer and the following tack values as measured by a Thwing-Albert Inkometer.

| | Clear vehicle | | | | | 100 parts vehicle—40 parts carbon black | | | | |
|---|---|---|---|---|---|---|---|---|---|---|
| | Inkometer reading | | | Shear rate, sec.⁻¹ | Viscosity, poise | Inkometer reading | | | Shear rate, sec.⁻¹ | Viscosity, poise |
| | 400 r.p.m. | 800 r.p.m. | 1,200 r.p.m. | | | 400 r.p.m. | 800 r.p.m. | 1,200 r.p.m. | | |
| Uralkyd prepared in Example 6A | 3.2 | 4.6 | 5.2 | 726<br>1,296<br>2,005 | 17.5<br>17.3<br>16.1 | 7.0 | 9.0 | 11.0 | 2.0<br>20.0<br>188.0<br>378.0<br>582.0 | 1,300<br>500<br>119<br>113<br>106 |

Formula 6B

A mixture of 7.5 parts pentaerythritol, 59 parts of water free linseed oil, 15 parts of water free aliphatic ink oil (Reprol) and 1.5 parts of lithium ricinoleate are heated with stirring to 410° F. Reaction is continued until a hydroxyl value of 150 is obtained. 3.5 parts of phthalic anhydride and the mixture condensed at a temperature of about 200° F. to a hydroxyl value of about 114 under a blanket of carbon dioxide. The mixture is cooled to a temperature of 150° F. and 15 parts of toluene diisocyanate (mixed isomers) are added. The modified uralkyd thus formed had the following tack and viscosity values shown in the first unit horizontal row of the table below, measured on the same instruments used in Example 6A for the clear vehicle and the vehicle pigmented with carbon black. The uralkyd was further modified by combining 15 parts of a 20 poise bodied linseed oil with 35 parts of the prepared uralkyd. Tack and viscosities of the clear vehicle and pigmented ink are reported in the second unit horizontal row of the table below.

| | Clear vehicle | | | | | 100 parts vehicle—40 parts carbon black | | | | |
|---|---|---|---|---|---|---|---|---|---|---|
| | Inkometer reading | | | Shear rate, sec.⁻¹ | Viscosity, poise | Inkometer reading | | | Shear rate, sec.⁻¹ | Viscosity, poise |
| | 400 r.p.m. | 800 r.p.m. | 1,200 r.p.m. | | | 400 r.p.m. | 800 r.p.m. | 1,200 r.p.m. | | |
| Uralkyd prepared in Example 6B | 14.0 | 15.5 | 15.6 | 19.9<br>29.0<br>39.0<br>49.0<br>71.5 | 2,682<br>2,485<br>2,362<br>2,254<br>2,230 | 12.5 | 12.8 | 12.6 | 2.6<br>5.5<br>10.2<br>13.0<br>15.1 | 21,800<br>20,000<br>17,500<br>15,400<br>13,793 |
| 85% uralkyd in Example 6B, 15% of a 20 poise bodied linseed | 10.6 | 13.5 | 16.2 | 33.2<br>141.0<br>291.0<br>422.0<br>630.0 | 370<br>298<br>279<br>262<br>253 | 16.0 | 17.8 | 17.8 | 21.6<br>53.8<br>74.3<br>99.3<br>123.0 | 3,735<br>3,165<br>2,802<br>2,587<br>2,424 |

EXAMPLE 6

The following two inks represent a comparison of clear vehicles and black ink compositions in which in one case a modified uralkyd of the present invention is used (Example 6B) in the vehicle and which in the other case (Example 6A) a urethane not derived from an alkyd prepolymer is employed in the vehicle all viscosities and tack readings are corrected to 25° C. Example 6A does not form a part of the instant invention.

Comparison of the viscosity and tack of the formulations of Examples 6A and 6B demonstrate that the viscosity for a given tack value of formulation 6B (the present invention) is approximately 10 to 20 times higher than the viscosity at approximately the same tack for the formulation 6A.

It should be also noted that the inkometer readings for the tack of the Example 6B formulation show essentially constant inkometer readings between 400 r.p.m. and 1200 r.p.m.

Unless otherwise specified, all viscosity values are stated in poise units corrected to 25° C. and all tack values are measured on a Thwing-Albert Inkometer.

In the claims:

1. In a printing ink comprising a coloring agent and an oxidative vehicle, the improvement, conferring a low tack-to-viscosity ratio, whereby said vehicle comprises from 10% to 100% by weight of a uralkyd prepared by reacting an aliphatic or aromatic polyisocyanate with an alkyd prepolymer reaction product of an unsaturated fatty acid or ester thereof, a polyol and an aryl polycarboxylic acid, wherein the aryl group is an aromatic hydrocarbon having from 6–20 carbons or an anhydride of such acid or mixtures thereof and wherein the equivalent weight of alkyd prepolymer to polyisocyanate is 1/0.8 to 1/1.2.

2. The printing ink of claim 1, wherein the vehicle comprises 100% by weight of uralkyd.

3. The printing ink of claim 1, wherein the polyisocyanate is toluene diisocyanate and the polycarboxylic acid is selected from the group consisting of ortho-, meta- and para- benzene dicarboxylic acid, anhydrides of such acids and mixtures thereof.

4. The printing ink of claim 1, wherein the alkyd prepolymer is characterized by having a hydroxyl value of between 35–290 and an acid number of 0–5.0.

5. The printing ink of claim 1, wherein the unsaturated fatty acid is derived by hydrolysis of a member selected from the group consisting of drying oils and semidrying oils.

6. The printing ink of claim 1, wherein the alkyd prepolymer is characterized by having a hydroxyl value of between 100 and 125 and an acid number of between 0.05 and 0.2.

7. The printing ink of claim 1, wherein the polyisocyanate is selected from the group consisting of
hexamethylene diisocyanate,
1,5-naphthylenediisocyanate,
p-phenylene diisocyanate,
m-phenylene diisocyanate,
4,4'-diisocyanate dibenzyl,
diphenylmethane-p-p'-diisocyanate,
triphenylmethane-p-p'-diisocyanate,
tetramethylene-diisocyanate,
4,4'-dicyclohexylmethane-diisocyanate,
1-methyl benzene-2,4,6-triisocyanate,
1-chloro-phenylene-2,4-diisocyanate,
xenylene-4,4'-diisocyanate,
cyclohexylene-1,2-diisocyanate,
cyclohexylene-1,4-diisocyanate,
4,4'-diphenyl diisocyanate,
3,5-tolyl diisocyanate,
2,4-tolylene diisocyanate,
3,3'-dimethyl 4,4'-biphenylene diisocyanate,
3,3'-dimethoxy 4,4'-biphenylene diisocyanate,
4,4'-methylene di-o-tolyl diisocyanate;
and the polycarboxylic acid is selected from the group consisting of ortho-, meta- and para- benzene dicarboxylic acid, anhydrides of such acids and mixtures thereof.

8. In a printing ink consisting essentially of
(A) from 10 to 60% by weight of a color body selected from the group consisting of inorganic and organic pigments and dyes and
(B) an oxidative vehicle;
an improvement conferring on said ink a low tack-to-viscosity ratio, said improvement being that said vehicle comprises from 10% to 100% by weight of a uralkyd, said uralkyd prepared by the sequential steps of
(i) preparing an alkyd pre-polymer, said pre-polymer being the reaction product of
(a) an unsaturated fatty acid formed by the hydrolysis of a drying or semi-drying oil selected from the group consisting of linseed oil, tung oil, safflower oil and soybean oil,
(b) a polyol selected from the group consisting of pentaerythritol, sorbitol, mannitol and trimethylol-propane and
(c) an aryl polycarboxylic acid wherein the aryl group is an aromatic hydrocarbon group from 6 to 20 carbons, or an anhydride of such acid or mixtures thereof,
said alkyd pre-polymer being further characterized by having a hydroxyl value between 35 and 290 and an acid number from 0 to 520 and
(ii) then reacting the pre-polymer with an aliphatic or aromatic polyisocyanate in amounts such that the ratio of mol equivalence of an alkyd pre-polymer relative to the polyisocyanate is in the range of 1/0.8 to 1/1.2, said polyisocyanate being selected from the group consisting of hexamethylene diisocyanate,
diphenylmethane diisocyanate
p-phenylene diisocyanate,
m-phenylene diisocyanate,
4,4'-diisocyanate dibenzyl,
naphthylene-1,5-diisocyanate,
triphenylmethane-p-p'-diisocyanate,
tetramethylene-diisocyanate,
4,4'-dicyclohexylmethanediisocyanate,
1-methyl benzene-2,4,6-triisocyanate,
tolylene-2,4-diisocyanate,
1-chloro-phenylene-2,4-diisocyanate,
xenylene-4,4'-diisocyanate,
cyclohexylene-1,2-diisocyanate,
cyclohexylene-1,4-diisocyanate,
4,4'-diphenyl diisocyanate
3,5-tolyl diisocyanate,
3,3'-dimethyl 4,4'-biphenylene diisocyanate,
3,3'-dimethoxy 4,4'-biphenylene diisocyanate,
4,4'-methylene di-o-tolyl diisocyanate;
and the polycarboxylic acid is selected from the group consisting of ortho-, meta- and para- benzene dicarboxylic acid, anhydrides of such acids and mixtures thereof.

9. In a printing ink consisting essentially of
(A) from 10–60% by weight of a color body selected from the group consisting of inorganic and organic pigments and dyes and
(B) an oxidative vehicle;
an improvement conferring on said ink a low tack-to-viscosity ratio, said improvement being that said vehicle consists essentially of a uralkyd prepared by the sequential steps of
(i) preparing an alkyd pre-polymer by reaction of
(a) an unsaturated fatty acid derived by hydrolysis of an oil selected from the group consisting of linseed oil, tung oil, safflower oil and soybean oil,
(b) a polyol selected from the group consisting of pentaerythritol, sorbitol, mannitol and trimethylolpropane and
(c) an acid and/or anhydride selected from the group consisting of ortho-, meta- and para- benzene dicarboxylic acids, anhydrides of such acids and mixtures thereof,
said alkyd prepolymer being characterized by having a hydroxyl value of between 100 and 125 and an acid number of between 0.05 and 0.2,
(ii) reacting the pre-polymer with toluene diisocyanate in mol equivalent ratio of alkyd pre-polymer relative to polyisocyanate in the ranges of 1/0.8 to 1/1.2.

References Cited

UNITED STATES PATENTS 3,645,933  2/1972  Flint _____ 260—40 T N
2,282,827  5/1942  Rothrock _____ 260—22

(Other references on following page)

UNITED STATES PATENTS

| | | | |
|---|---|---|---|
| 2,886,455 | 5/1959 | Doggett et al. | 106—252 |
| 2,970,062 | 1/1961 | Hauge et al. | 106—252 X |
| 2,998,399 | 8/1961 | Petropoulos | 260—22 |
| 3,041,203 | 6/1962 | Sites et al. | 106—28 X |
| 3,245,810 | 4/1966 | Heiss et al. | 106—27 |
| 3,255,500 | 6/1966 | Engel et al. | 260—22 |
| 3,437,500 | 4/1969 | Hennig et al. | 106—252 |
| 3,244,673 | 4/1966 | Bruin et al. | 260—22 |

FOREIGN PATENTS

| | | | |
|---|---|---|---|
| 1,047,046 | 11/1966 | Great Britain | 260—22 |
| 1,183,920 | 12/1964 | Germany | 106—28 |

OTHER REFERENCES

American Inkmaker, No. 5, vol. 48, May 1970 (pp. 57–68, 116 relied on) (p. 68 in particular).

DONALD E. CZAJA, Primary Examiner

R. W. GRIFFIN, Assistant Examiner

U.S. Cl. X.R.

106—27, 28, 252; 117—38; 260—Dig. 38

UNITED STATES PATENT OFFICE
CERTIFICATE OF CORRECTION

Patent No. 3,778,395    Dated December 11, 1973

Inventor(s) Gregory J. Huelsman, Wyckoff, and Robert E. Bell and Gerald Edward Rohe It is certified that error appears in the above-identified patent and that said Letters Patent are hereby corrected as shown below:

Column 6 line 4:
Delete "1A" and add ---2A---

Signed and sealed this 16th day of April 1974.

(SEAL)
Attest:

EDWARD M. FLETCHER, JR.
Attesting Officer

C. MARSHALL DANN
Commissioner of Patents